(No Model.)　　　　　　　　　　　　　　　5 Sheets—Sheet 1.
J. F. McELROY.
SYSTEM OF CHARGING CAR HEATING APPARATUS WITH HEATING MEDIUMS.

No. 473,635.　　　　　　　　Patented Apr. 26, 1892.

Witnesses.
P. M. Hulbert
M. B. O'Dogherty.

Inventor:
James F. McElroy
by Thos. B. Sprague
Attys (No Model.) 5 Sheets—Sheet 2.
J. F. McELROY.
SYSTEM OF CHARGING CAR HEATING APPARATUS WITH HEATING MEDIUMS.

No. 473,635. Patented Apr. 26, 1892.

Witnesses:

Inventor:
James F. McElroy (No Model.) 5 Sheets—Sheet 3.
J. F. McELROY.
SYSTEM OF CHARGING CAR HEATING APPARATUS WITH HEATING MEDIUMS.
No. 473,635. Patented Apr. 26, 1892.
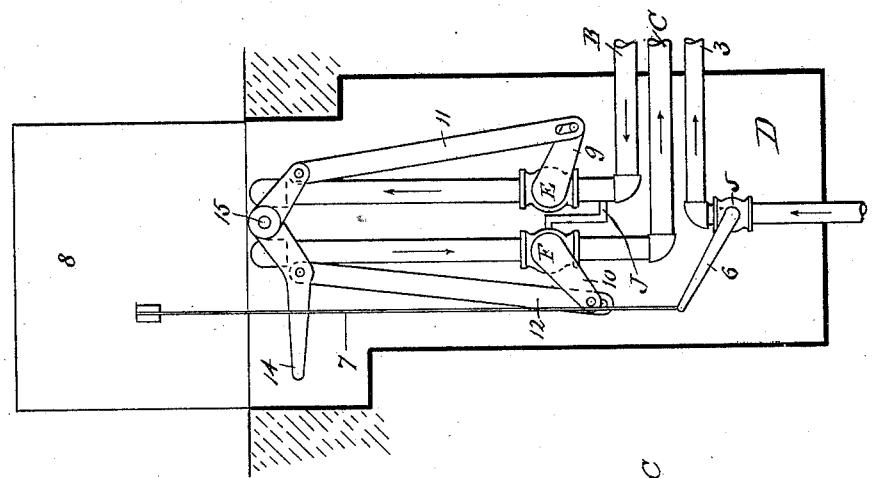
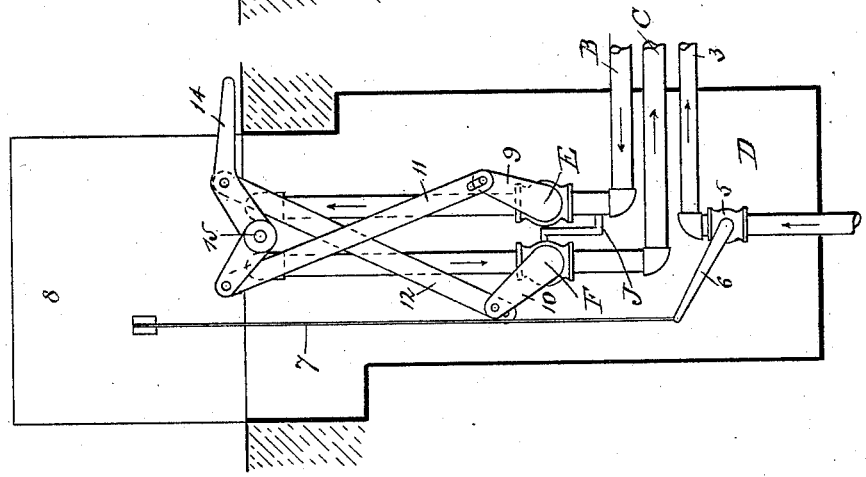
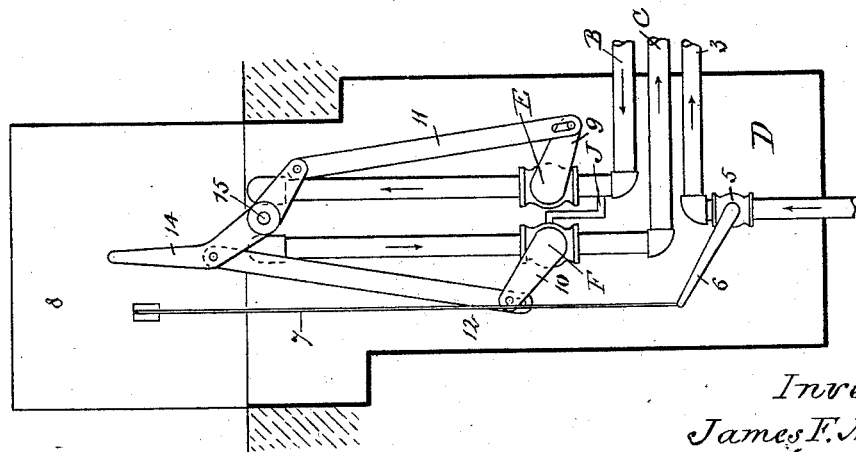

(No Model.) 5 Sheets—Sheet 4.
J. F. McELROY.
SYSTEM OF CHARGING CAR HEATING APPARATUS WITH HEATING MEDIUMS.
No. 473,635. Patented Apr. 26, 1892.
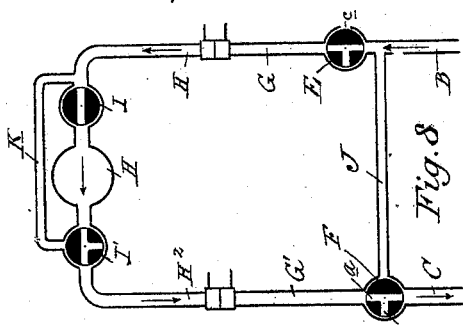
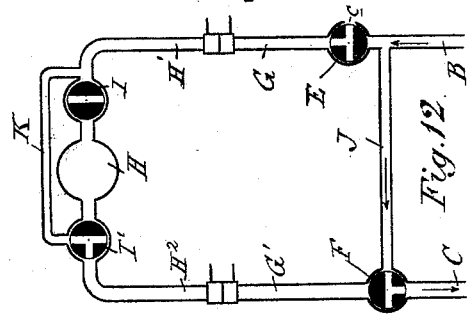
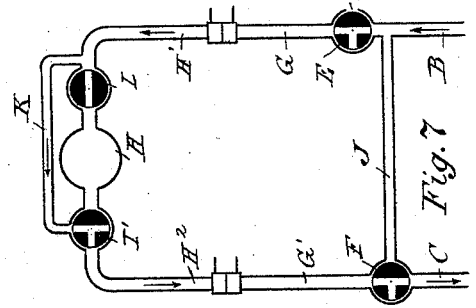
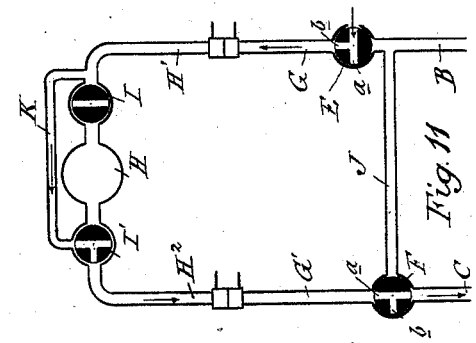
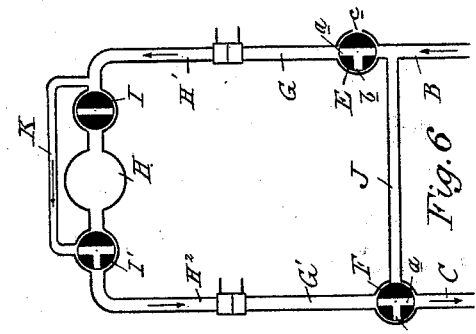
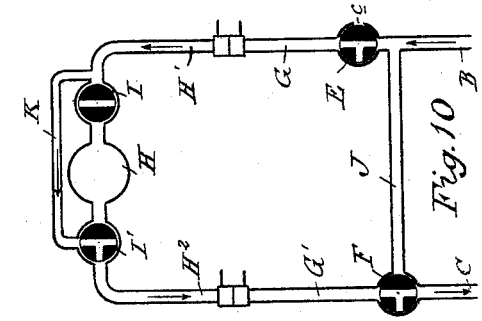
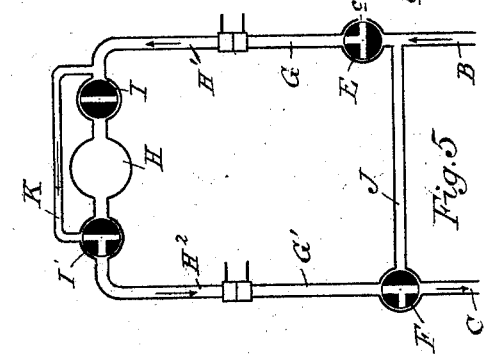
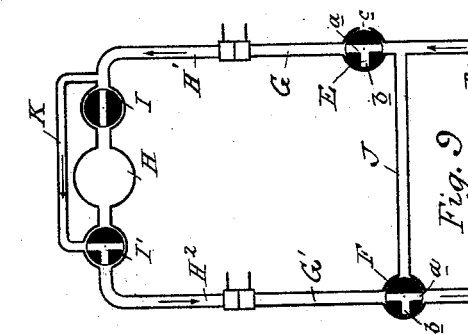
Witnesses:
Inventor.
James F. McElroy (No Model.) 5 Sheets—Sheet 5.
J. F. McELROY.
SYSTEM OF CHARGING CAR HEATING APPARATUS WITH HEATING MEDIUMS.
No. 473,635. Patented Apr. 26, 1892.
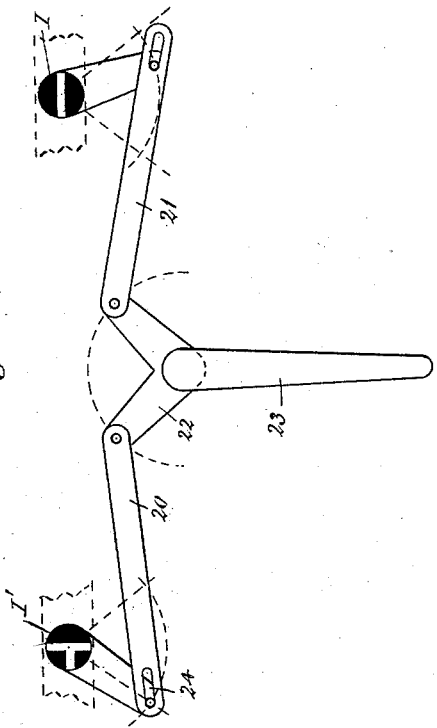
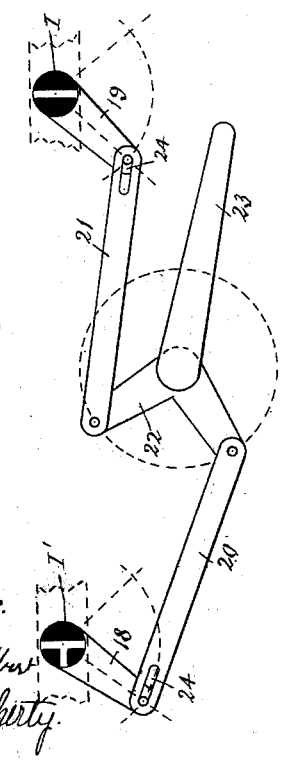
Witnesses.
Inventor.
James F. McElroy
by Thos. S. Sprague & Son
Attys

UNITED STATES PATENT OFFICE.

JAMES F. McELROY, OF ALBANY, NEW YORK, ASSIGNOR TO THE CONSOLIDATED CAR-HEATING COMPANY, OF WHEELING, WEST VIRGINIA.

SYSTEM OF CHARGING CAR-HEATING APPARATUS WITH HEATING MEDIUMS.

SPECIFICATION forming part of Letters Patent No. 473,635, dated April 26, 1892.

Application filed June 15, 1891. Serial No. 396,408. (No model.)

*To all whom it may concern:*

Be it known that I, JAMES F. McELROY, a citizen of the United States, residing at Albany, in the county of Albany and State of New York, have invented certain new and useful Improvements in Systems of Charging Car-Heating Apparatus with a Heating Medium, of which the following is a specification, reference being had therein to the accompanying drawings.

This invention relates to new and useful improvements in a system of charging car-heating apparatus with a heating medium.

The invention consists in the peculiar construction and arrangement of a system of pipes and valves in the street and on the car and the coupler-section between the two, whereby receptacles or piping on the car may be filled with a heating medium—such as water—in the quickest possible time without danger of commingling the hot and cold water and without danger of scalding or burning the operator in charge in coupling and uncoupling.

The invention consists, further, in the peculiar construction, arrangement, and combination of the various parts, all as more fully hereinafter described.

Figure 1:
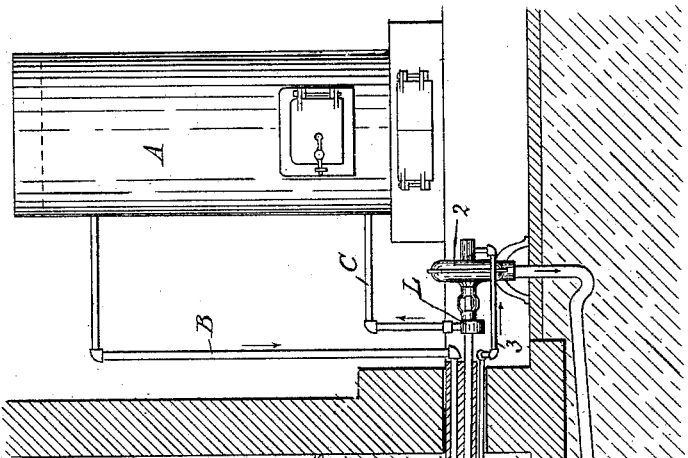
Figure 1:
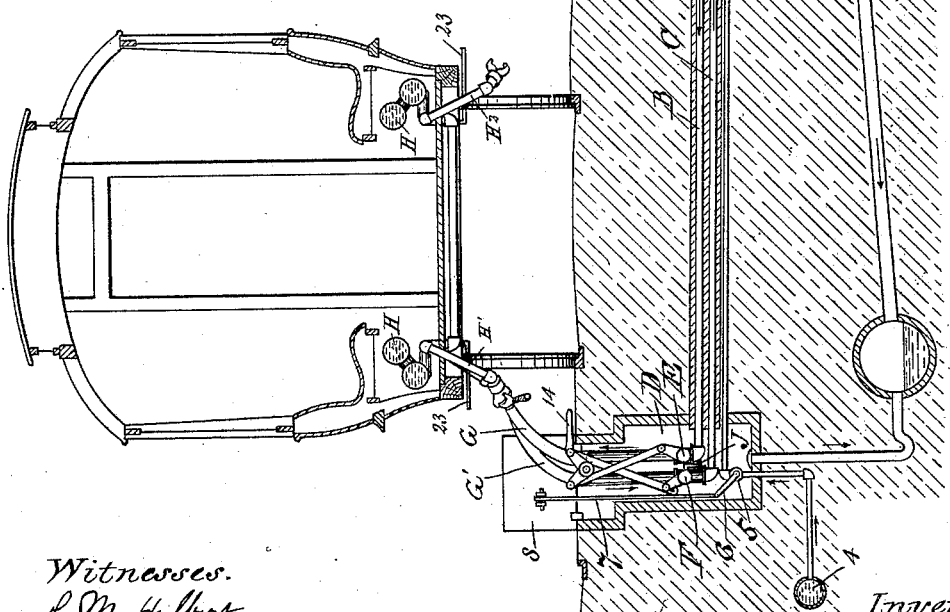
Figure 2:
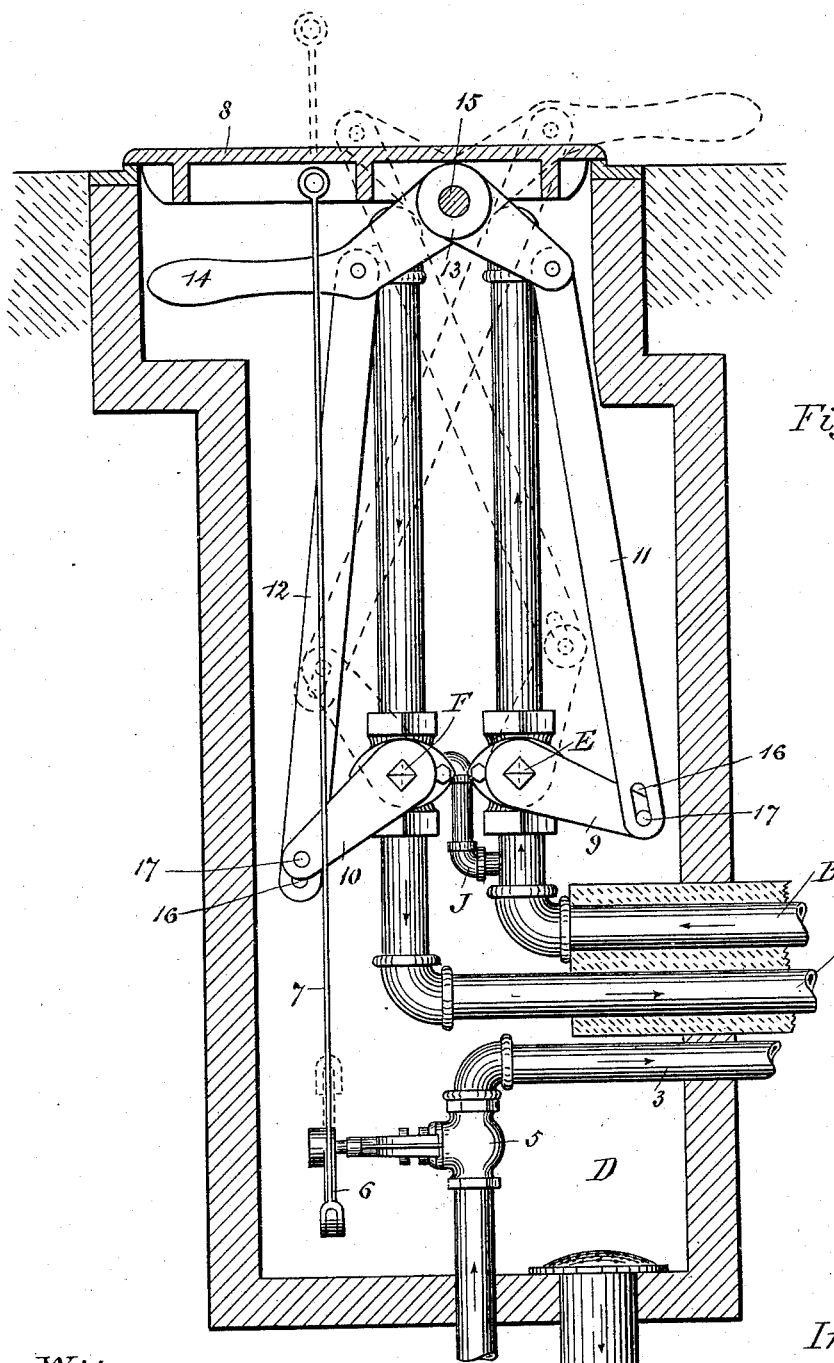

In the drawings, Figure 1 shows a section through a roadway and building and my improved apparatus in elevation. Fig. 2 is an enlarged section of the well containing the valves and valve-operating mechanism in the street. Figs. 3, 4, and 17 are diagrams showing the positions of the valve-levers at their different periods in the operation of my improved device. Figs. 5, 6, 7, 8, 9, 10, 11, and 12 show phases of the valves on the car and in the street at different stages of the operation. Figs. 13, 14, 15, and 16 are diagrams showing the positions of the valve-operating mechanism on the car.

A is a water-heater, preferably constructed with an open top or with an air-valve. B is an outgoing pipe from the top thereof. C is the return-pipe entering the bottom. These pipes extend to within proximity of the railway-track and terminate in a well D. They are controlled by valves E and F, respectively, and at their ends are provided with flexible hose G G', at the end of which are suitable couplers.

The car is provided with any suitable radiator or tank, such as H, having an inlet-pipe H' and an outlet-pipe H''. These pipes are provided with suitable couplers adapted to couple with the hose connection in the street. They are controlled by the valves I I', the valve I being a straight-way valve and the valve I' a three-way valve.

J is a connecting-pipe between the ingoing and outgoing pipes B and C in the lower end of the well D to allow of the circulation through said pipes and the connecting-pipe at times when tanks are not being filled to prevent their freezing up. This connecting-pipe extends from a point below the valve E directly into the valve F. The valves E and F are three-way valves having the main passage $a$ and the auxiliary passage or port $b$.

1 is a pump in the return-pipe; 2, a water-motor for operating said pump. 3 is a supply-pipe to said motor extending from the supply-pipe 4 and controlled by a valve 5. This valve has an operating-lever 6, to which is attached a rod 7, connected at the upper end to the cover 8 of the well. These parts are so arranged that on opening the cover the valve is opened and the motor started, drawing water from the pipe C and discharging it into the bottom of the heater, the water being supplied from the pipe B through the connecting-pipe J and ports $a$ $b$ in the valve F.

K is a by-pass pipe connecting the supply and discharge pipes on the car through the three-way valve I', as shown in Fig. 5, around the tank or radiator.

The mechanism to move the valves E and F is shown in Figs. 3, 4, and 17, and consists of levers 9 and 10, connecting-bars 11 and 12, and the bell-crank lever 13. The connecting-bars 11 and 12 are connected, respectively, to the ends of the actuating valve-levers and to the ends of the arms of the bell-crank lever.

14 is an actuating-lever to rock the bell-crank lever upon its shaft 15. Each bar 11 and 12 is provided with a slot 16, engaging with the pin 17 on the valve-operated lever to allow of lost motion at certain points in the movement.

The mechanism for moving the valve I I' consists of similar valve-actuating levers 18 and 19, connecting-rods 20 and 21, bell-crank lever 22, and actuating-lever 23 therefor. These connecting-rods are also provided with slots 24 for the purpose of allowing lost motion at points in the movement of the lever 23. As the car comes to the supply-station and is stopped opposite the well in the street the attendant opens the cover 8 of the well, which, through the connections described, opens the valve 5 and starts the motor 2 to work, which in turn operates the pump, drawing the water from the pipe C and discharging it into the base of the heater, quickly filling the pipe B with hot water. The car-man next couples together the flexible pipes from the well and the pipes on the car. At this point in the operation the coupling-circuit and valves are in the position shown in Fig. 12. The car-man now throws the lever 14 to a vertical position, as shown in Fig. 3, which, through the connections described, will turn the valve F a quarter of a turn, the valve E remaining stationary. The circuit through the by-pass J is stopped; but the motor continuing to run will draw the water from the return-pipe C, air coming in back of it through the port c of the valve E, the coupling-pipes, the by-pass K, the three-way valve I, and the other leg of the coupling-section, as shown in Fig. 5. The car-man next throws the lever 14 clear over to the position shown in Fig. 4, which closes the air-passage in the valve E and allows the hot water to pass through that valve through the by-pass K and into the return-pipe C, as shown in Fig. 6. The car-man next moves the lever 23 on the car from the position shown in Fig. 13 to the position shown in Fig. 14, which moves the valve I' a quarter of a turn and opens the passage-way therethrough to connect to the tank or radiator on the car, as shown in Fig. 7. The operator then throws the lever 23 to its farthest position, (shown in Fig. 15,) which opens the main passage through the valve I and closes the by-pass K, and circulation is now established, as shown in Fig. 8, from the heater through the tank and back to the heater. By this arrangement of valves and levers I am enabled to get the hot water to the car immediately upon opening the valve, and by getting rid of the air in the return-pipe before allowing the water to pass through I obtain a quicker circulation for the water when it is allowed to enter that branch.

The direction of the circulation is fully established in the outgoing and return pipes before I allow it to enter the tank, which prevents any possibility of the commingling of the hot and cold water in the tank, as the cold water is drawn from the lowest point and the hot water discharged at the highest point thereof.

When the return-pipe has become hot, indicating that the tank is full of hot water and it is returning hot to the heater, the car-man first throws the lever 23 to the position shown in Fig. 16, which closes the valve I to the tank and opens it to the by-pass K, as shown in Fig. 9, checking the circulation. He next moves the lever 23 to the position shown in Fig. 13, which closes the valve I' and returns the hot water in the tank or radiator in the car between the valves I and I', but allows the circulation to continue through the by-pass, as shown in Fig. 10. He next moves the lever 14 in the street to the vertical position, as shown in Fig. 3, which turns the valve E a quarter of a turn, closes the pipe B, and opens the air-passage in said valve. The coupling-section and the by-pass K are now quickly emptied of water by the pump and filled with air through the air-opening c in the valve E, and when this is accomplished the car-man throws the lever 14 to the position shown in Fig. 17, closing the valve F to the main circuit and opening it to the connecting-pipe J. The parts being then as shown in Fig. 12, the car-man may now safely uncouple the hose-section and replace the hose in the well, closing the cover and stopping the motor.

It will be evident that there will be no danger of scalding or burning in this operation, as the coupling-section both on the car and in the street will have been entirely freed from water and steam in the manner described. This also prevents the danger of freezing of the parts, as the vertical portions of the pipes in the well are freed from water and the hot-water circulation is maintained through the pipes B and C and the connecting-pipe J at all times. The air entering through the return-pipe C escapes through the top of the heater, which, as previously described, is preferably open.

The arrangement of the parts of the above-described invention, whereby a complete circulation of the heating medium is obtained through the outgoing and return pipes, both when the pipes are coupled to the car and when the coupling is broken, and the means for actuating the pump, I have made the subject-matter of a concurrently-pending application filed June 18, 1891, Serial No. 396,778.

What I claim as my invention is—

1. In a system for charging storage-heaters with a heating medium, the combination, with a tank on a car, of a stationary heater, an outgoing and return pipe communicating with the heater, a coupling system between the tank and pipes, and means for governing the movement of the heating medium through the pipes and tank and permitting the entrance of air into the system, substantially as described.

2. In a system for charging storage-heaters with a heating medium, the combination, with the tank on the car, the heater outgoing and return pipes between the heater and tank, one of which has an air-passage therein, a coupling-section for uniting the pipes and tank, and a pump in the return-pipe, of valves adapted to shut off the supply-pipe and open the air-passages, whereby the coupling-section may be drained, substantially as described.

3. In a system for charging storage-heaters with a heating medium, the combination, with the tank on the car, the stationary water-heater, outgoing and return pipes from the heater, and a pump in the return-pipe, of a coupling-section connecting the pipes with the tank and a three-way valve having an air-passage therein and located at the junction of said section with the supply-pipe adapted to open the air-passage when the supply-pipe is closed, substantially as described.

4. In a system for charging storage-heaters with a heating medium, the combination of a storage-tank and coupling-section, by-pass valves located at opposite ends thereof, levers connecting the valves, a three-arm bell-crank lever, and connecting-rods between two of the arms of the bell-crank and the ends of the levers, substantially as described.

5. In a system for charging storage-heaters with a heating medium, the combination of a tank on the car, a stationary heater, outgoing and return pipes leading from the heater, a coupling-section for the pipes and tank, a pump in the return-pipe, and means for shutting off the outgoing-pipe and to admit air to the return-pipe, substantially as described.

6. In a system for charging storage-heaters with a heating medium, the combination of the heater, outgoing and return pipes for the same, a tank on the car, a coupling-section comprising two connecting-pipes for connecting the tank with the outgoing and return pipes, a by-pass on the car, and the valves I I' for controlling the passage of the heating medium through the tank and by-pass, substantially as described.

7. In a system for charging heaters with a heating medium, the combination of the heater, outgoing and return pipes for the same, a tank on the car, a coupling-section between said pipes and tank, comprising two connecting-pipes, a by-pass on the car, and the valves E F for controlling the passage of the heating medium through the pipes, and valves I and I' for controlling the passage through the by-pass and tank, substantially as described.

8. In a system for charging storage-heaters with a heating medium, the combination, with a storage-tank and heater, of outgoing and return pipes from the heater, a coupling-section between the pipes and tank, valves in the coupling-section, a lever having arms arranged at an angle to each other, a hand-piece on the lever, connecting-links between valve-stems of the valves and the opposite ends of the lever formed with elongated slots in their lower ends, and means for making the coupling between the section and the tank, substantially as described.

In testimony whereof I affix my signature in presence of two witnesses.

JAMES F. McELROY.

Witnesses:
EDWIN A. SMITH,
JOHN B. BRAIDWOOD.